F. H. HEADLEY.
SPRING MOUNTING FOR VEHICLES.
APPLICATION FILED DEC. 16, 1913.
1,245,339. Patented Nov. 6, 1917.
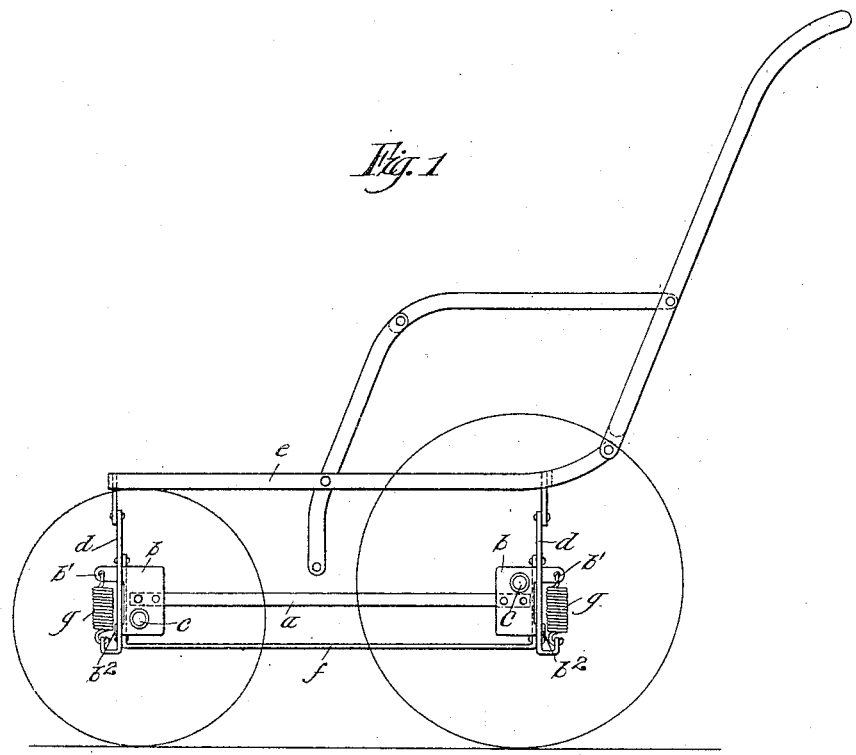
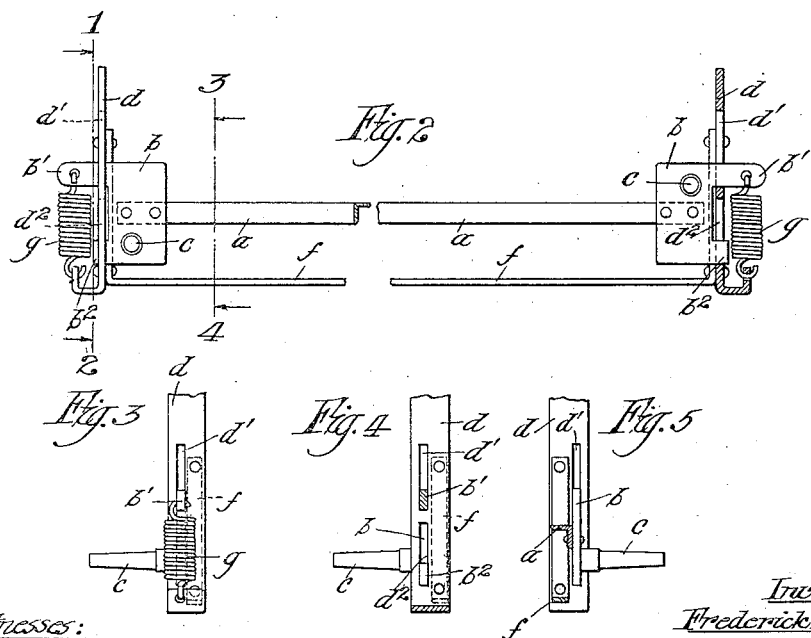

UNITED STATES PATENT OFFICE.

FREDERICK HAGGER HEADLEY, OF BIRMINGHAM, ENGLAND.

SPRING-MOUNTING FOR VEHICLES.

1,245,339.  Specification of Letters Patent.  Patented Nov. 6, 1917.

Application filed December 16, 1913. Serial No. 807,105.

*To all whom it may concern:*

Be it known that I, FREDERICK HAGGER HEADLEY, subject of the King of Great Britain, residing at 65 Stirling road, Edgbaston, in the city of Birmingham, England, have invented certain new and useful Improvements in Spring - Mountings for Vehicles, of which the following is a specification.

This invention has for its object to provide an improved spring mounting for wheels of various forms of vehicles, but more especially perambulators, go-carts, and the like.

The invention comprises the adaptation of a rigid spring controlled member carrying a pair of wheels and vertical guides on the vehicle body for said members so that in addition to a simple vertical movement of the wheel carrying member relatively to both guides a limited free horizontal movement of said member is permitted in order that vertical rocking movement can occur at either end of the member about the other end as a fulcrum, thus enabling a relative movement between either or both of the wheels and guides with a resulting sensitive spring mounting of the wheels to be obtained in a simpler manner than heretofore.

Referring to the accompanying sheet of explanatory drawings:—

Figure 1 is a diagrammatic side elevation of a baby carriage or go-cart provided with a spring mounting for its wheels in accordance with this invention. Fig. 2 is a side elevation with part in section and Fig. 3 is an end elevation of the spring mounting, on a larger scale than in Fig. 1. Figs. 4 and 5 are respectively cross sections of the spring mounting on lines 1, 2 and 3, 4 of Fig. 2.

As here shown, the usual pairs of wheels at opposite sides of the vehicle are each mounted on a rigid wheel carrying member, that is to say, the pair of wheels on one side are mounted on one member and those at the other side are mounted on a similar member. Each member preferably comprises a rigid bar $a$ having at each end a plate $b$ carrying a short axle $c$. A pair of vertical guides $d$ secured to the underframe $e$ of the vehicle are formed from metal strips or bars which are preferably connected at their lower ends by a horizontal bar $f$ serving as a stiffener. If desired the guides and stiffener may be produced integrally from a single strip or bar. Each guide is formed with a pair of slots $d'$ and $d^2$ disposed vertically the one beneath the other, and through such slots project lateral extensions $b'$ and $b^2$ from the plate aforesaid on the adjacent end of the wheel carrying bar. To one of such extensions or to any convenient part of the plate or bar is attached one end of a controlling spring $g$ which at its other end is connected to the guide or the stiffener or other convenient part of the vehicle underframe or body.

The construction and arrangement of the various parts above mentioned is such that if a wheel encounters an obstacle it can rise together with the adjacent end of the wheel carrying bar against the action of its spring without affecting the other end of the said bar and the wheel attached thereto. In this event the bar rocks about the stationary end. Sufficient horizontal or endwise freedom of the member $a$ in the required direction is afforded in the construction to permit such movement, while the arrangement of superimposed slots in the guides and projections from the bar plates passing through the slots avoids any risk of the bar becoming disconnected from its guides at either end and furnishes a convenient fulcrum, to wit the solid portion between the two slots. Obviously the effect of such fulcrum can be obtained in various other ways that will suggest themselves to a skilled mechanic.

The guides $d$ may be hinged or otherwise attached to the underframe as shown to permit the wheels to be folded beneath the underframe in go-carts and like vehicles of the collapsible type.

Instead of extensions from the plates and slots in the guides as herein described any equivalent construction may be adopted, and the details may also be varied in other respects to meet different services or requirements. And it is obvious that instead of making the ends of the wheel carrying member to work against the inner sides of the vertical guides and fulcrum thereon as shown in the appended drawings, said wheel carrying member, whether a simple or a compound member, may have its ends passed through or by respective guides and there loosely secured by cross pins or shoulders which will provide equivalent fulcrums on the outer sides of said guides and at the same time impose the desirable horizontal or longitudinal constraint upon the wheel bearing member.

Having thus described my invention I claim as new and desire to secure by Letters Patent:

1. In spring mountings for go-carts and the like, a go-cart frame having depending vertical guides, in combination with a rigid member carrying a pair of wheels and having its ends held by and extending through respective guides, springs constraining the movement of said member with respect to said guides and said guides serving to limit the longitudinal movement of said member, substantially as and for the purpose specified.

2. In spring mountings for vehicles, a rigid spring controlled member carrying a pair of wheels, in combination with vertical guides for said member and through which the ends of said members project, the construction being such that in addition to a simple vertical movement of the wheel carrying member relatively to both guides a limited free horizontal movement of the said member is permitted in order that a vertical rocking movement can occur at either end of the member about the other end as a fulcrum, substantially as described.

3. In spring mountings for vehicles the combination comprising a rigid wheel-carrying member, a pair of vertical guides through which the ends of said member extend and between which the said member is so mounted that it can both slide and rock relatively to the guides, and springs controlling the movement of the wheel carrying member, substantially as described.

4. In a child's go-cart a seat bearing body, in combination with side frames depending therefrom, a wheel carrying bar for each side frame, said bar having an end slidably fulcrumed upon its side frame, vertical guides upon said frame for respective bar-ends and through which the same extend and load carrying springs one for each wheel and interposed between respective ends of said bars and said frame.

In testimony whereof, I have hereunto set my hand this 25th day of November, 1913, in the presence of two subscribing witnesses.

FREDERICK HAGGER HEADLEY.

Witnesses:
JOHN MORGAN,
EDWARD LILL.

Copies of this patent may be obtained for five cents each, by addressing the "Commissioner of Patents, Washington, D. C."